US 6,739,049 B2

(12) United States Patent
Nicholson

(10) Patent No.: US 6,739,049 B2
(45) Date of Patent: May 25, 2004

(54) METHOD OF MANUFACTURING AN ARTICLE BY DIFFUSION BONDING AND SUPERPLASTIC FORMING

(75) Inventor: Stephen Nicholson, Barnoldswick (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/360,804

(22) Filed: Feb. 10, 2003

(65) Prior Publication Data
US 2003/0154586 A1 Aug. 21, 2003

(30) Foreign Application Priority Data
Feb. 20, 2002 (GB) .............................................. 0203955

(51) Int. Cl.$^7$ .............................................. B23P 15/00
(52) U.S. Cl. .............................. 29/889.72; 29/889.721; 29/889.7
(58) Field of Search .................... 29/889.72, 889.7, 29/889.721, 421.1, 897.2, 897.31, 897.312; 228/157, 190, 265, 193; 416/232

(56) References Cited

U.S. PATENT DOCUMENTS

| 5,072,871 A | * | 12/1991 | Moracz et al. | ............... | 228/193 |
| 5,083,371 A | * | 1/1992 | Leibfried et al. | ......... | 29/889.72 |
| 5,243,758 A | * | 9/1993 | LeMonds et al. | ......... | 29/889.72 |
| 5,269,058 A | * | 12/1993 | Wiggs et al. | ............. | 29/889.72 |
| 5,285,573 A | * | 2/1994 | LeMonds et al. | ......... | 29/889.72 |
| 5,297,723 A | | 3/1994 | Benn et al. | .................. | 228/186 |
| 5,323,536 A | * | 6/1994 | Fowler et al. | ............ | 29/889.72 |
| 5,603,449 A | * | 2/1997 | Mansbridge et al. | ........ | 228/157 |
| 5,636,440 A | | 6/1997 | Bichon | | |
| 5,729,901 A | | 3/1998 | Fowler | | |
| 5,826,332 A | | 10/1998 | Bichon | | |
| 6,467,168 B2 | * | 10/2002 | Wallis | ................... | 29/889.721 |
| 2003/0154586 A1 | * | 8/2003 | Nicholson | .................. | 29/421.1 |

FOREIGN PATENT DOCUMENTS

| EP | 0 601 773 A1 | * | 6/1994 |
| GB | 2 306 353 A | | 5/1997 |
| GB | 2 360 236 A | | 9/2001 |
| GB | 2360236 A | | 9/2001 |

* cited by examiner

Primary Examiner—I Cuda Rosenbaum
(74) Attorney, Agent, or Firm—W. Warren Taltavull; Manelli, Denison & Selter PLLC

(57) ABSTRACT

A method of manufacturing a gas turbine engine fan blade (10) comprises forming three metal workpieces (50,52,54). A metal slab (30) is upset forged at both ends (32,34) to produce a metal block (40) with increased thickness (42,44) extending from opposite surfaces (36,38). The metal block (40) is cut in an inclined path to form two of the metal workpieces (50,52). The metal workpieces (50,52,54) are assembled into a stack (56) so that the flat surfaces (38,42, 46,48) are in mating abutment. Heat and pressure is applied across the thickness of the metal workpieces (50,52,54) to diffusion bond the metal workpieces (53,52,54) together to form an integral structure (100). The integral structure (100) is hot creep formed and superplastically formed to produce the required aerofoil shape and the thickened end is machined to form the blade root (26). The method enables thinner metallic workpieces with better microstructure to be used and increases the yield of metallic workpieces.

25 Claims, 4 Drawing Sheets

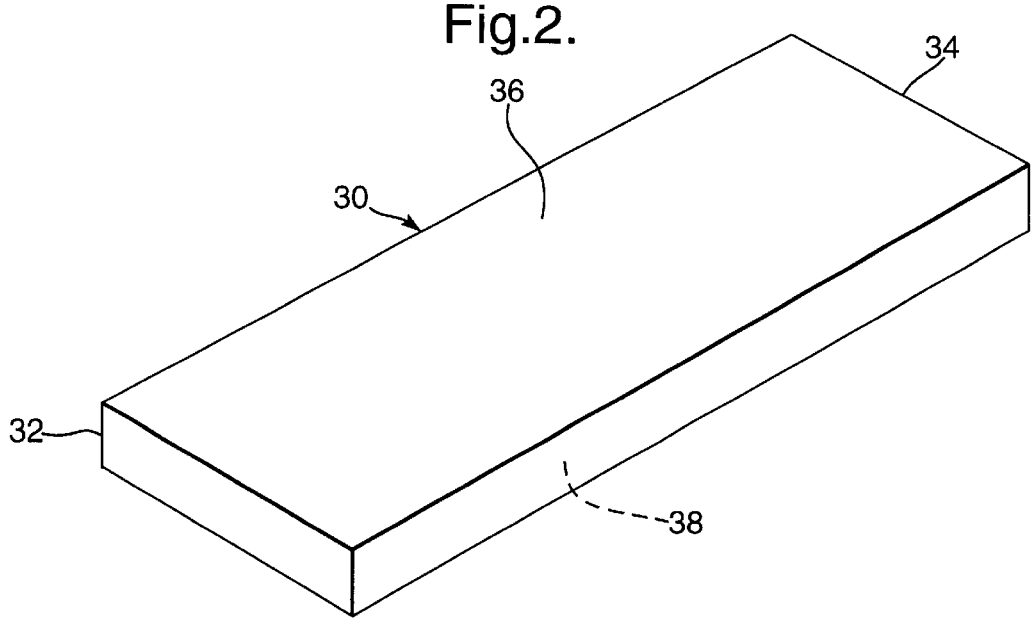
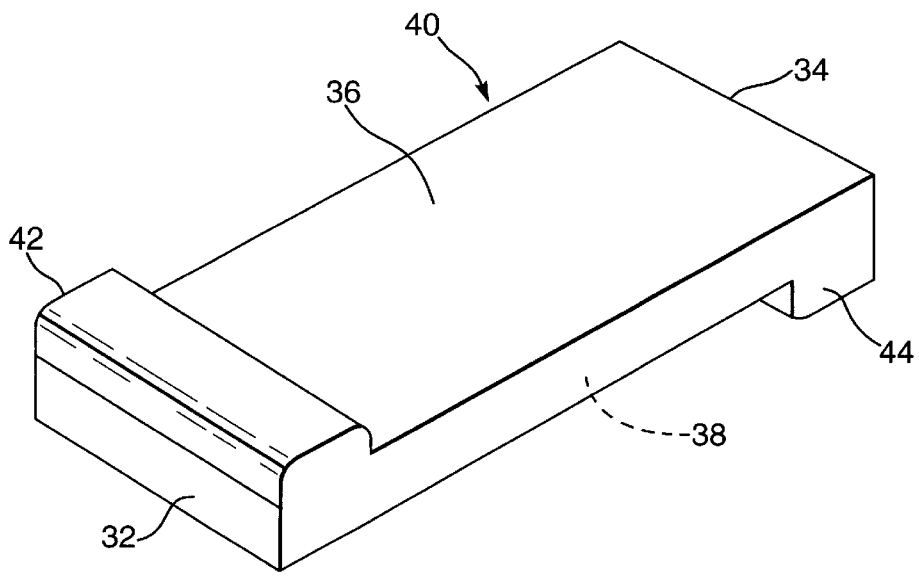

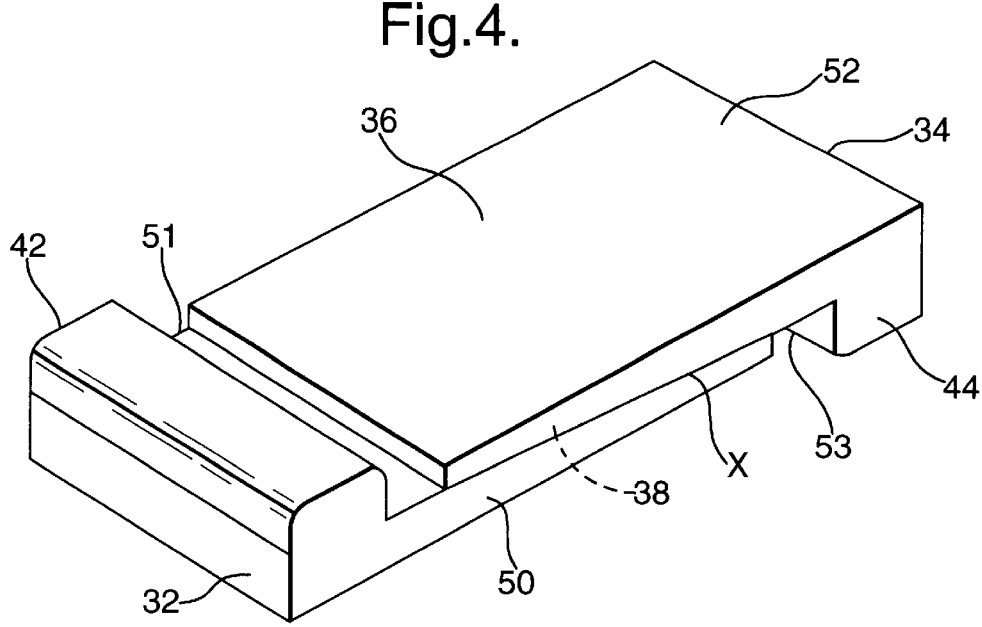
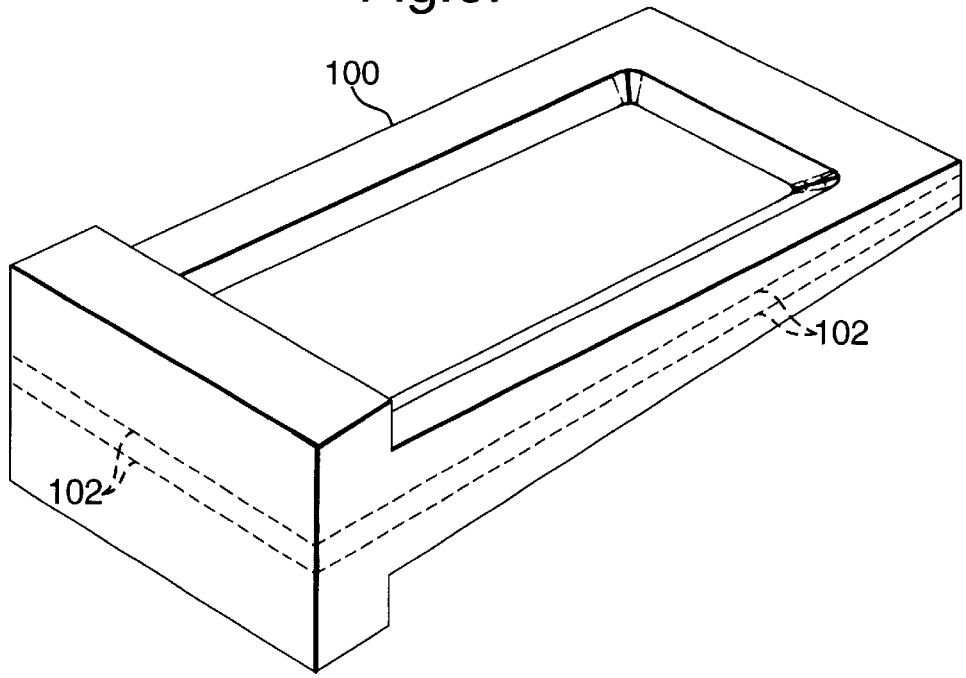

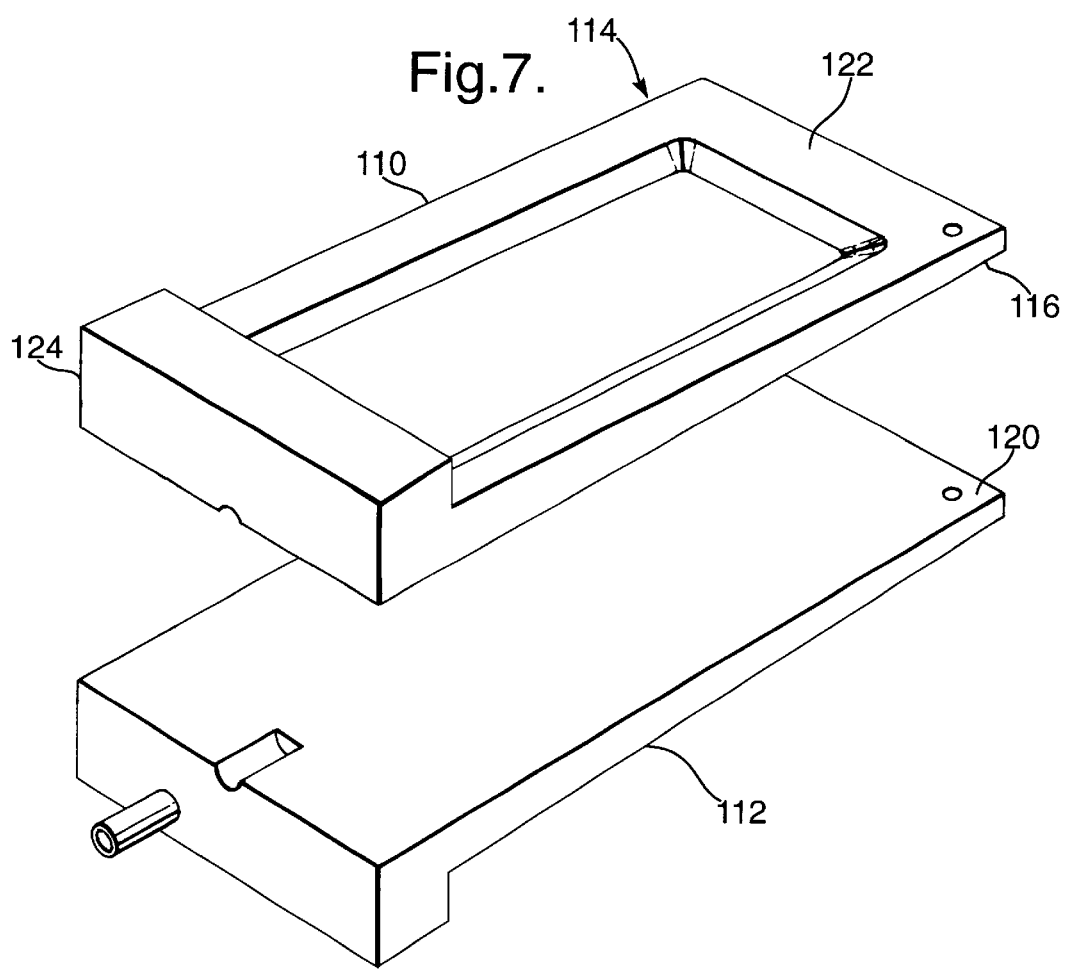

METHOD OF MANUFACTURING AN ARTICLE BY DIFFUSION BONDING AND SUPERPLASTIC FORMING

FIELD OF THE INVENTION

The present invention relates to a method of manufacturing an article by diffusion bonding and superplastic forming.

BACKGROUND OF THE INVENTION

It is known to manufacture hollow metallic articles by diffusion bonding and superplastic forming metal workpieces. These metal workpieces include elementary metal, metal alloys, intermetallic materials and metal matrix composites.

The diffusion bonding and superplastic forming process may be used to produce contoured articles for example fan blades, or fan duct outlet guide vanes, for gas turbine engines by superplastically, or hot forming, an integral structure formed by the diffusion bonding process.

A procedure for manufacturing an article by diffusion bonding and superplastic forming is disclosed in our European patent EP0568201B. In EP0568201B the integral structure formed by the diffusion bonding process is twisted before the integral structure is superplastically formed. Additionally the integral structure is hot creep formed in the superplastic forming dies.

Additionally our UK patent GB2306353B discloses manufacturing a fan blade by diffusion bonding and superplastic forming. In GB2306353B the integral structure is formed from two metallic workpieces which subsequently define the outer profile of the fan blade. The two metallic workpieces are produced by cutting an inclined slot through a parallelepiped metal block to produce two longitudinally tapering metallic workpieces. The thicker ends of the metallic workpieces are aligned to form the root of the fan blade and the remainder of the metallic workpieces are machined to the appropriate thickness to give the required mass distribution.

This manufacturing process requires that the thickness of the original parallelepiped metallic block is about half, just less than half, of the thickness of the root of the finished fan blade in order to allow machining to produce the root. A problem with this process is that it is wasteful of metal, machining time and is expensive. Additionally the microstructure of the parallelepiped metallic block is not the optimum microstructure, due to the thickness of the original metallic block.

The problem is partially overcome, as also disclosed in GB2306353B, by using thinner parallelepiped metallic blocks and adding extra small blocks at the thicker ends of the two longitudinally tapering metallic workpieces to form the root of the fan blade. However, this process is still wasteful of metal, machining time and is expensive. The microstructure of the parallelepiped block is improved due to the smaller thickness of the parallelepiped block. But there are the additional requirements of welding on the extra small blocks and evacuating the spaces between the metallic workpieces and the blocks to ensure a diffusion bond forms. The microstructure of the metallic workpieces is still not the optimum microstructure due to the thickness of the original parallelepiped metallic block.

SUMMARY OF THE INVENTION

Accordingly the present invention seeks to provide a novel method of manufacturing an article by diffusion bonding which overcomes the above-mentioned problems.

Accordingly the present invention provides a method of manufacturing an article of predetermined finished profile by diffusion bonding and superplastic forming at least two metal workpieces comprising the steps of:
  (a) forming a metal slab, the metal slab having first and second ends and first and second surfaces,
  (b) forging the first end of the metal slab to produce a region of increased thickness at the first end of the metal slab and extending from the first surface of the metal slab and forging the second end of the metal slab to produce a region of increased thickness at the second end of the metal slab and extending from the second surface of the metal slab,
  (c) machining the metal slab from the first surface to the second surface to form two metal workpieces, each metal workpiece has at least one surface,
  (d) applying a stop off material to prevent diffusion bonding to preselected areas of at least one of the surfaces of at least one of two metal workpieces,
  (e) assembling the at least two metal workpieces into a stack relative to each other so that the surfaces are in mating abutment,
  (f) applying heat and pressure across the thickness of the at least two metal workpieces to diffusion bond the at least two metal workpieces together in areas other than the preselected areas to form an integral structure,
  (g) heating the integral structure and internally pressurising the integral structure to cause the preselected area of at least one of the at least two metal workpieces to be hot formed to produce a hollow article of predetermined shape.

Preferably the method comprises after step (f) and before step (g) placing the integral structure in a hot creep forming die, heating the integral structure while it is within the die to cause the integral structure to be hot creep formed on the convex surface of the die.

Preferably step (c) comprises machining the metal slab to form a first metal workpiece and a second metal workpiece. Preferably step (c) comprises forming a third metal workpiece, the third metal workpiece having two flat surfaces, and step (e) comprises assembling the three metal workpieces into the stack relative to each other so that third metal workpiece is between the first and second metal workpieces and the flat surfaces are in mating abutment.

The hollow article may be a fan blade or a compressor blade.

The hollow article may be a fan outlet guide vane, a compressor blade or a fan blade.

After diffusion bonding the stack of workpieces and before superplastically forming the integral structure, the integral structure may be heated and loads may be applied to opposite ends of the integral structure to twist one end relative to the other end to contour the integral structure to a predetermined shape.

After twisting the integral structure and before superplastic forming the integral structure, the contoured integral structure may be internally pressurised to break the adhesive bond between the stop off material and the at least one workpiece in the preselected area.

Preferably after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

Preferably after diffusion bonding the stack of workpieces and before superplastically forming the integral structure, the integral structure is internally pressurised to break the adhesive bond between the stop off material and the at least one workpiece in the preselected area.

Preferably after the metal workpieces are arranged in a stack and before the metal workpieces are diffusion bonded together to form an integral structure, the edges of the metal workpieces are sealed.

Preferably the edges of the metal workpieces are welded together.

Preferably where the metal workpieces are made of a titanium alloy, the metal workpieces are heated to a temperature equal to, or greater than, 850° C. and the pressure applied is equal to, or greater than, $20 \times 10^5$ Nm$^{-2}$ to diffusion bond the workpieces together to form an integral structure.

Preferably the metal workpieces are heated to a temperature between 900° C. and 950° C. and the pressure applied is between $20 \times 10^5$ Nm$^{-2}$ and $30 \times 10^5$ Nm$^{-2}$.

Preferably the integral structure is heated to a temperature equal to, or greater than, 850° C. to superplastically form the integral structure.

Preferably the integral structure is heated to a temperature between 900° and 950° C.

Preferably the integral structure is hot creep formed at a temperature equal to, or greater than, 740° C.

Preferably step (b) comprises upset forging.

Preferably the region of increased thickness is machined. Preferably the region of increased thickness is subsequently machined to form a dovetail root or a firtree root. Preferably step (b) comprises heating the integral structure to a predetermined temperature before forging. Preferably the integral structure is heated to a temperature between 900° C. and 950° C.

Preferably in step (a) each of the at least two metal workpieces has at least one flat surface.

Preferably step (c) comprises machining the metal slab to form two longitudinally tapering metal workpieces.

Preferably step (e) comprises arranging the thicker ends of the metal workpieces at one end of the stack.

BRIEF DESCRIPTION OF THE DRAWINGS

The present invention will be more fully described by way of example with reference to the accompanying drawings in which:

FIG. 2 is a perspective view of a metal slab before upset forging has been performed.

FIG. 3 is a perspective view of a metal slab before upset forging has been performed.

FIG. 4 illustrates machining the forged metal slab to form two metal workpieces.

FIG. 6 is a perspective view of the stack of three metal workpieces shown in FIG. 5 showing the integral structure after the diffusion bonding step has been performed.

FIG. 7 illustrates an exploded view of a stack of the two metal workpieces shown in FIG. 4, which are superplastically formed, and diffusion bonded to form an article according to the present invention.

DETAILED DESCRIPTION OF THE INVENTION

Figure 1:
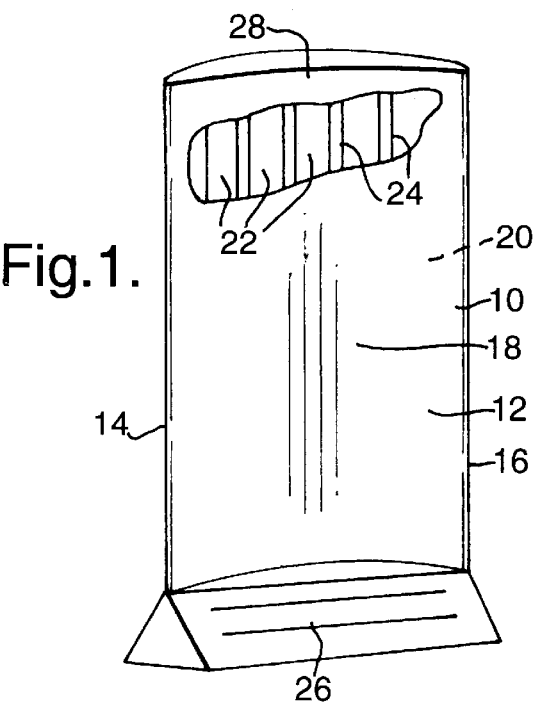
FIG. 1 shows an article manufactured by superplastic forming and diffusion bonding according to the present invention.

A turbofan gas turbine engine fan blade 10, shown in FIG. 1, comprises an aerofoil shaped body 12, which has a leading edge 14, a trailing edge 16, a concave surface 18, a convex surface 20, a root 26 and a tip 28. The fan blade 10 is hollow and comprises a plurality of spaces 22 within the aerofoil shaped body 12 separated by a warren girder structure 24.

An original parallelepiped titanium alloy slab 30 is produced as shown in FIG. 2 and the titanium alloy slab 30 has a first end 32 and a second end 34 and a first surface 36 and a second surface 38. The parallelepiped titanium alloy slab 30 is upset forged to produce a titanium alloy block 40 as shown in FIG. 3. In particular both of the first and second ends 32 and 34 of the parallelepiped titanium alloy slab 30 are upset forged to produce an increase in thickness 42 at the first end 32 and an increase in thickness 44 at the second end 34, as shown in FIG. 3. It is to be noted that the increase in thickness 42 extends from the first surface 36 and the increase in thickness 44 extends from the second surface 38. These increases in thickness 42 and 44 of the titanium alloy block 40 subsequently become the root 26 of the fan blade 10. The upset forging comprises placing the parallelepiped titanium alloy slab 30 in forging dies, heating to a temperature of 900° C. to 950° C. and then forging the first and second ends 32 and 34.

Two longitudinally tapering titanium alloy workpieces 50 and 52 are produced by machining first and second slots 51 and 53 in the first and second surfaces 50 and 52 respectively of the titanium alloy block 40 and cutting the titanium alloy block 40 along an inclined plane X from the first slot 51 in the first surface 36 to the second slot 53 in the second surface 38 to form the two longitudinally tapering titanium alloy workpieces 50 and 52, as shown in FIG. 4, and as described more fully in our UK patent GB2306353B. The first slot 51 is adjacent the increased thickness 42 and the second slot 53 is adjacent the increased thickness 44. The cutting is preferably by bandsawing.

Figure 5:
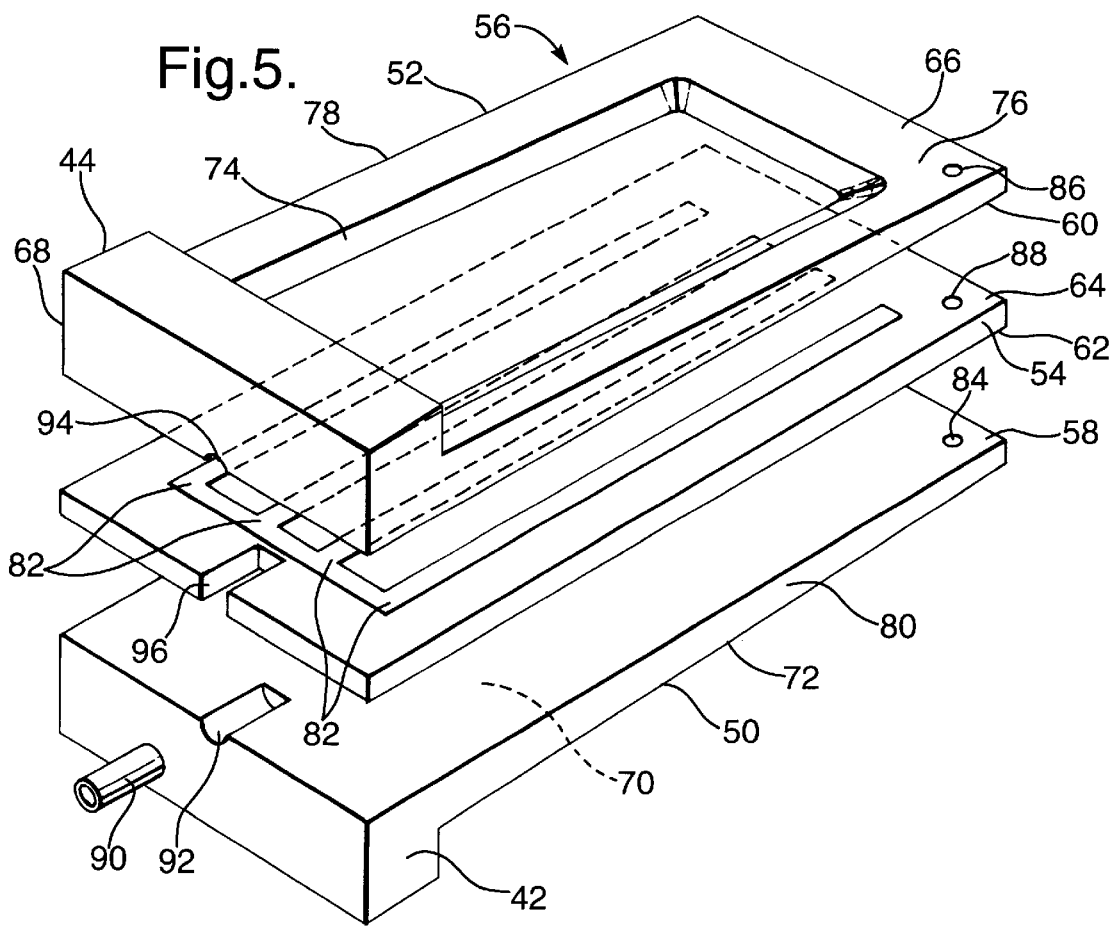
FIG. 5 illustrates an exploded view of a stack of the two metal workpieces shown in FIG. 4 and a further metal workpiece, which are subsequently superplastically formed, and diffusion bonded to form an article according to the present invention.

The two titanium alloy workpieces 50 and 52 and a third titanium alloy workpiece 54 are assembled into a stack 56, as shown in FIG. 5. The workpiece 50 has a single flat surface 58, the workpiece 52 has a single flat surface 60 and the workpiece 54 has two flat surfaces 62 and 64. The flat surfaces 58 and 62 of the workpieces 50 and 54 respectively are arranged to abut each other and the flat surfaces 60 and 64 of the workpieces 52 and 54 respectively are arranged to abut each other. The workpieces 50 and 52 taper, increase in thickness, longitudinally from the end 66 to the end 68. The workpieces 50 and 52 are arranged such that the increased thickness regions 42 and 44 of the workpieces 50 and 52 respectively are at the end 68.

Prior to assembling the workpieces 50, 52 and 54 into the stack 56, the first workpiece 50 is machined in a region 70, centrally of a surface 72 of the first workpiece 50, and the second workpiece 52 is machined in a region 74, centrally of a surface 76 of the second workpiece 52. The central machined regions 70 and 74 are contoured to produce a variation in the mass distribution of the fan blade 10 from leading edge 14 to trailing edge 16 and from root 26 to tip 28 by varying the depth of machining. For example by varying the thickness of the first and second workpieces 50 and 52, across the central machined region 70 and 74 in the direction between the edges 78 and 80 and in the direction between the ends 66 and 68 of the first and second workpieces 50 and 52.

The machining of the central machined regions 70 and 74 of the first and second workpieces 50 and 52 respectively is by milling, electrochemical machining, chemical machining, electrodischarge machining or any other suitable machining process.

The abutting surfaces 58 and 62 of the workpieces 50 and 54 and the abutting surfaces 60 and 64 of the workpieces 52 and 54 respectively are then prepared for diffusion bonding by chemical cleaning. One of the abutting surfaces 58 and 62, in this example abutting surface 62, has had a stop off material 82 applied. Similarly one of the abutting surfaces 60 and 64, in this example abutting surface 64, has had a stop off material applied. The stop off material may comprise powdered yttria in a binder and solvent e.g. the stop off known as "Stopyt 62A" which is sold by an American company named GTE Service Corporation of 100 Endecott Street, Danvers, Mass. 10923, USA.

The stop off material is applied in desired patterns, by the known silk screen printing process or other suitable process. The desired patterns of stop off material prevent diffusion bonding between preselected areas of the workpieces 50, 52 and 54. In this example the stop off material is applied in straight lines on the surfaces 62 and 64 of the workpiece 54 except for regions adjacent the edges 78 and 80 and ends 66 and 68 sufficient to provide a satisfactory diffusion bond.

The workpiece 50 has a pair of dowel holes 84, which are axially aligned with corresponding dowel holes 86 in workpiece 52 and dowel holes 88 in workpiece 54 to ensure the correct positional relationship between the three workpieces 50, 52 and 54. The workpieces 50, 52 and 54 are maintained in this positional relationship by a pair of dowels (not shown) which are inserted into the axially aligned dowel holes 84, 86 and 88.

The workpieces 50, 52 and 54 of the stack 56 are placed together to trap an end of a pipe 90. In this example a groove 92 is machined on surface 58 of the first sheet 50 and a groove 94 is machined on surface 60 of the second workpiece 52 and a slot 96 is machined in the third workpiece 54. The pipe 90 is positioned to project from between the three workpieces 50, 52 and 54. One end of the pipe 90 interconnects with the pattern of stop off material between the workpieces 50, 52 and 54. On completion of the assembly in the manner described it is welded about its periphery so as to weld the edges and ends of workpieces 50, 52 and 54 together. The pipe 90 is also welded around its periphery to the workpieces 50, 52 and 54. A welded assembly is formed which is sealed except for the inlet provided by the pipe 90.

It is to be noted that the pipe 90 is located at one end, in this example the end, which subsequently forms the root 26 of the fan blade 10, of the sealed assembly, however, it is preferably located at the tip 28 of the fan blade 10.

The pipe 90 is then connected to a vacuum pump which is used to evacuate the interior of the welded assembly and then inert gas, for example argon, is supplied to the interior of the welded assembly. This evacuating and supplying inert gas to the interior of the welded assembly may be repeated several times in order to ensure that most, or substantially all, traces of oxygen are removed from the interior of the welded assembly. The particular number of times that the interior of the welded assembly is evacuated and purged with inert gas depends upon the size of the workpieces and upon the required integrity of the finished component or article. The smaller the traces of oxygen remaining, the greater is the quality of the subsequent diffusion bond. The inert gas is supplied to pressurise the interior of the welded assembly to atmospheric pressure.

The welded assembly is evacuated and is placed in an oven. The welded assembly is then heated to a temperature between 250° C. and 350° C. to evaporate the binder from the stop off material. During the baking out of the binder, the welded assembly is continuously evacuated to remove the binder from between the workpieces 50, 52 and 54. After the binder has been removed, which is determined either by monitoring the binder levels in the gas extracted from the welded assembly or by maintaining the welded assembly at the temperature between 250° C. and 350° C. for a predetermined time, the welded assembly is removed from the oven and is allowed to cool to ambient temperature whilst being continuously evacuated. The binder is baked out of the welded assembly at a suitably low temperature to reduce, or prevent, oxidation of the exterior surface of the welded assembly.

The pipe 90 is then sealed so that there is a vacuum in the welded assembly and thus a sealed assembly is formed. The sealed assembly is then transferred carefully to an autoclave. The temperature in the autoclave is increased such that the sealed assembly is heated to a temperature greater than 850° C. The argon pressure in the autoclave is raised to greater than 20 atmospheres, 294 pounds per square inch ($20.26 \times 10^5$ $Nm^{-2}$) and held at that temperature and pressure for a predetermined time. Preferably the sealed assembly is heated to a temperature between 900° C. and 950° C. and the pressure is between 294 pounds per square inch ($20.26 \times 10^5$ $Nm^{-2}$) and 441 pounds per square inch ($30.39 \times 10^5$ $Nm^{-2}$). For example if the sealed assembly is heated to a temperature of 925° C. and the pressure is raised to 300 pounds per square inch the temperature and pressure are held constant for about two hours. The pressure is then reduced to ambient, diffusion bonding having been achieved and the sealed assembly, which is then an integral structure 100, is removed from the autoclave. The diffusion bonding has occurred at regions 102 indicated by dashed lines and diffusion bonding has been prevented at other regions as shown in FIG. 6.

The pipe 90 is removed from the integral structure 100 and a second pipe is fitted to the integral structure 100.

The integral structure 100 is then placed in a hot creep forming die and the integral structure 100 is heated while it is within the die to cause the integral structure 100 to be hot creep formed to produce an aerofoil shape. During the hot creep forming process the integral structure 100 is heated to a temperature of 740° C.

The hot creep formed integral structure 100 is then placed in a superplastic forming die, which comprises a concave surface and a convex surface. Inert gas, for example argon, is introduced into the areas, within the hot creep formed integral structure 100, containing the stop off material in order to break the adhesive grip, which the diffusion bonding pressure has brought about. The argon is carefully introduced to those areas which contain the stop off material, and the argon seeps through the stop off material and eventually reaches the opposing end of the hot creep formed integral structure 100. The argon must travel the whole length of the interior of the hot creep formed integral structure 100 such as to break the adhesive grip between the stop off material and the workpieces 50, 52 and 54 brought about during the diffusion bonding step.

This step may be carried out at room temperature because the metal is elastic at room temperature and the minimal extension, which occurs, does not go beyond the elastic limit. Consequently the hot creep formed integral structure 100 regains its shape when pressure is removed at the end of the step. Alternatively the step may be carried out at the superplastic forming temperature, however there is a serious risk of progressive plastic deformation lengthwise of the hot creep formed integral structure 100, rather than simultaneous deformation over the whole of the hot creep formed integral structure 100. Nevertheless the skilled artisan will be able to control the breaking of the adhesive grip by suitable control of the pressure of the argon.

The second pipe is then connected to a vacuum pump which is used to evacuate the interior of the hot creep formed integral structure 100 and then inert gas, for example argon, is supplied to the interior of the hot creep formed integral structure 100. This process of evacuating and supplying inert gas to the interior of the hot creep formed integral structure 100 may be repeated several times in order to ensure that most, or substantially all, traces of oxygen are removed from the interior of the hot creep formed integral structure 100. The particular number of times that the interior of the hot creep formed integral structure 100 is evacuated and purged with inert gas depends upon the size of the workpieces and upon the required integrity of the finished component. The inert gas is supplied to pressurise the interior of the hot creep formed integral structure 100 to atmospheric pressure.

The hot creep formed integral structure 100 and superplastic forming die is placed in an autoclave. The hot creep formed integral structure 100 is again heated to a temperature greater than 850° C., preferably between 900° C. and 950° C. In this example, the dies and hot creep formed integral structure 100 are heated to 925° C. Inert gas, for example argon, is introduced into the interior of the hot creep formed integral structure 100 between the workpieces 50, 52 and 54, so as to hot form the workpieces 50 and 54 onto the surfaces of the die. This superplastically forms the workpiece 54 to generate a hollow internal structure depending on the pattern of the applied stop off material.

The magnitude of the movement of at least one of the sheets during deformation is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615–623 in the book "The Science, Technology and Application of Titanium" edited by R. I. Jaffe and N. E. Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the pulses of the gas pulses may thus vary during the expansion of the workpieces 50, 52 and 54.

On completion of hot forming/superplastic forming, the inert argon atmosphere within the integral structure is maintained whilst the structure is cooled. The integral structure is then machined and/or ground to remove excess metal and to produce the required leading edge and trailing edge shapes 14 and 16 of the finished fan blade 10 and to machine the increased thickness region 102 to produce a dovetail root or fir-tree root 26.

The advantage of upset forging the integral structure formed by diffusion bonding the metallic workpieces is that thinner original parallelepiped metallic slabs are used. This enables the use of metallic slabs, and hence metallic workpieces, with improved microstructure.

The use of thinner parallelepiped metallic slabs enables more metallic workpieces to be obtained from a single ingot of metal and thus more fan blades from a single ingot of metal. This also dispenses with the need to use additional metal blocks to form the root. The amount of machining required on the metallic workpieces before they are diffusion bonded together is reduced because the metallic workpieces are closer to finished shape and size.

For example a single ingot of titanium produced thirty parallelepiped slabs, of 21 mm thickness, which subsequently require cutting to produce sixty metal workpieces to form thirty fan blades. Whereas a single ingot of titanium produced forty five parallelepiped slabs, of 14 mm thickness, which subsequently require cutting to produce ninety metal workpieces to form forty five fan blades. This is a fifty percent improvement in material utilisation.

Another embodiment of the invention is shown in FIG. 7. In this embodiment two workpieces of titanium alloy 110 and 112 are assembled into a stack 114 as shown in FIG. 7. The workpiece 110 has a flat surface 116 and the workpiece 112 has a flat surface 120. The flat surfaces 116 and 120 of the workpieces 110 and 112 respectively are arranged to abut each other. The workpieces 110 and 112 taper, increase in thickness, longitudinally from the end 122 to the end 124.

The titanium alloy workpieces 110 and 112 are produced in the same manner as described with reference to FIGS. 2 and 3.

The two titanium alloy workpieces 110 and 112 are processed in a similar manner to the three titanium alloy workpieces 50, 52 and 54 described with reference to FIGS. 4 to 6.

On completion of hot forming/superplastic forming, the inert argon atmosphere within the integral structure is maintained whilst the structure is cooled. The integral structure is then machined and/or ground to remove excess metal and to produce the required leading edge and trailing edge shapes of the finished fan blade, compressor blade or fan outlet guide vane. The increased thickness region of the integral structure is machined to produce a dovetail root, or fir-tree root, for the fan blade or compressor blade or a suitable attachment feature for a fan outlet guide vane.

The fan blade, compressor blade or fan outlet guide vane formed from two metallic workpieces is a simple hollow structure without a warren girder structure.

The advantage of upset forging the metallic slab is again that thinner original parallelepiped metallic slabs are used. This enables the use of metallic blocks and hence metallic workpieces with improved microstructure.

The use of thinner parallelepiped metallic slabs enables more metallic workpieces to be obtained from a single ingot of metal and thus more fan blades, compressor blades or fan outlet guide vanes, from a single ingot of metal. This also dispenses with the need to use additional metal blocks to form the root or attachment feature. The amount of machining required on the metallic workpieces before they are diffusion bonded together is reduced because the metallic workpieces are closer to finished shape and size.

Although the description has referred to fan blades, compressor blades and fan outlet guide vanes the invention is equally applicable to other hollow articles, or hollow components, requiring a region of increased thickness to form an attachment feature or for other purposes.

Although the description has referred to titanium sheets, or workpieces, the invention is equally applicable to other metal sheets, or workpieces, which may be hot formed or superplastically formed.

Although the description has referred to diffusion bonding flat surfaces of the metal workpieces it may be possible to diffusion bond contoured surfaces of the metal workpieces.

Although the present invention has been described with reference to cutting the titanium alloy block in an inclined plane between two slots adjacent the regions of increased thickness, it may be possible to cut the titanium alloy block at any suitable position between the ends of the titanium alloy block, for example by cutting in a plane perpendicular to the surfaces of the titanium alloy block and at a position equi-distant from the ends of the titanium alloy block.

What is claimed is:

1. A method of manufacturing an article of predetermined finished profile by diffusion bonding and superplastic forming at least two metal workpieces comprising the steps of:
   (a) forming a metal slab, the metal slab having first and second ends and first and second surfaces,
   (b) forging the first end of the metal slab to produce a region of increased thickness at the first end of the metal slab and extending from the first surface of the metal slab and forging the second end of the metal slab to produce a region of increased thickness at the second end of the metal slab and extending from the second surface of the metal slab,
   (c) machining the metal slab from the first surface to the second surface to form two metal workpieces, each metal workpiece has at least one surface,
   (d) applying a stop off material to prevent diffusion bonding to preselected areas of at least one of the surfaces of at least one of two metal workpieces,
   (e) assembling the at least two metal workpieces into a stack relative to each other so that the surfaces are in mating abutment,
   (f) applying heat and pressure across the thickness of the at least two metal workpieces to diffusion bond the at least two metal workpieces together in areas other than the preselected areas to form an integral structure,
   (g) heating the integral structure and internally pressurising the integral structure to cause the preselected area of at least one of the at least two metal workpieces to be hot formed to produce a hollow article of predetermined shape.

2. A method as claimed in claim 1 wherein the method comprises after step (f) and before step (g) placing the integral structure in a hot creep forming die having a convex surface, heating the integral structure while it is within the die to cause the integral structure to be hot creep formed on the convex surface of the die.

3. A method as claimed in claim 1 wherein step (c) comprises machining the metal slab to form a first metal workpiece and a second metal workpiece.

4. A method as claimed in claim 3 wherein step (c) comprises forming a third metal workpiece, the third metal workpiece having two flat surfaces, and step (e) comprises assembling the three metal workpieces into the stack relative to each other so that third metal workpiece is between the first and second metal workpieces and the flat surfaces are in mating abutment.

5. A method as claimed in claim 4 wherein the hollow article is a fan blade or a compressor blade.

6. A method as claimed in claim 1 wherein the hollow article is a fan outlet guide vane, a compressor blade or a fan blade.

7. A method as claimed in claim 1 wherein after diffusion bonding the stack of workpieces and before superplastically forming the integral structure, the integral structure is heated and loads are applied to opposite ends of the integral structure to twist one end relative to the other end to contour the integral structure to a predetermined shape.

8. A method as claimed in claim 7 wherein after twisting the integral structure and before superplastic forming the integral structure, the integral structure is internally pressurised to break the adhesive bond between the stop off material and the at least one workpiece in the preselected area.

9. A method as claimed in claim 8 wherein after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

10. A method as claimed in claim 1 wherein after diffusion bonding the stack of workpieces and before superplastically forming the integral structure, the integral structure is internally pressurised to break the adhesive bond between the stop off material and the at least one workpiece in the preselected area.

11. A method as claimed in claim 1 wherein after the metal workpieces are arranged in a stack and before the metal workpieces are diffusion bonded together to form an integral structure, the edges of the metal workpieces are sealed.

12. A method as claimed in claim 11 wherein the edges of the metal workpieces are welded together.

13. A method as claimed in claim 1 wherein where the metal workpieces are made of a titanium alloy, the metal workpieces are heated to a temperature equal to, or greater than, 850° C. and the pressure applied is equal to, or greater than, 20×105 Nm-2 to diffusion bond the workpieces together to form an integral structure.

14. A method as claimed in claim 13 wherein the metal workpieces are heated to a temperature between 900° C. and 950° C. and the pressure applied is between 20×105 Nm-2 and 30×105 Nm-2.

15. A method as claimed in claim 13 wherein the integral structure is heated to a temperature equal to, or greater than, 850° C. to superplastically form the integral structure.

16. A method as claimed in claim 15 wherein the integral structure is heated to a temperature between 900° and 950° C.

17. A method as claimed in claim 2 wherein the integral structure is hot creep formed at a temperature equal to, or greater than, 740° C.

18. A method as claimed in claim 1 wherein step (b) comprises upset forging.

19. A method as claimed in claim 1 wherein the region of increased thickness is machined.

20. A method as claimed in claim 19 wherein the region of increased thickness is subsequently machined to form a dovetail root or a firtree root.

21. A method as claimed in claim 1 wherein step (b) comprises heating the integral structure to a predetermined temperature before forging.

22. A method as claimed in claim 21 wherein the integral structure is heated to a temperature between 900° C. and 950° C.

23. A method as claimed in claim 1 wherein step (c) each of the at least two metal workpieces has at least one flat surface.

24. A method as claimed in claim 1 wherein step (c) comprises machining the metal slab to form two longitudinally tapering metal workpieces.

25. A method as claimed in claim 1 wherein step (e) comprises arranging the thicker ends of the metal workpieces at one end of the stack.

* * * * *